(No Model.)
E. NOPPEL.
FILTER.
No. 328,333. Patented Oct. 13, 1885.
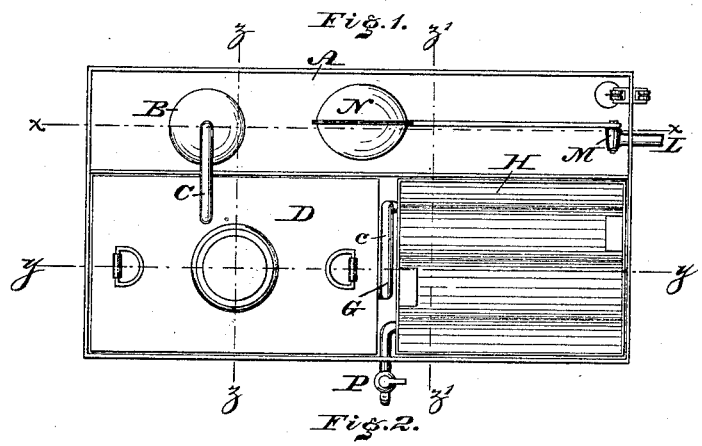
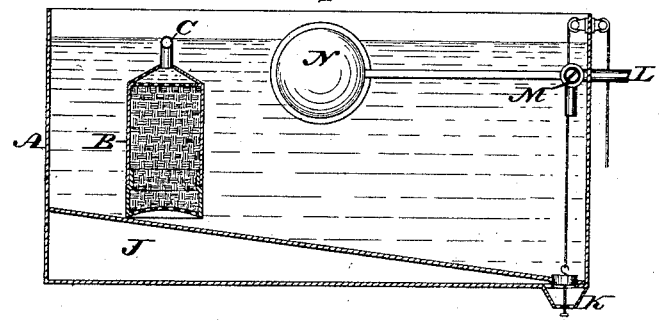
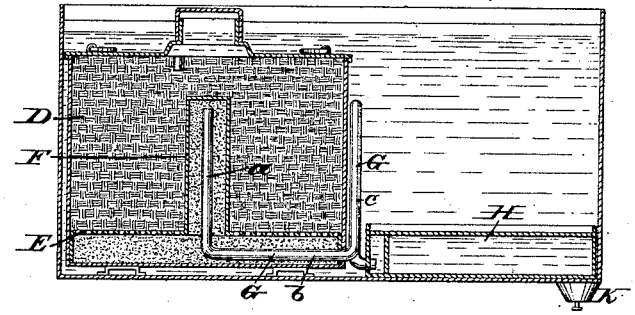
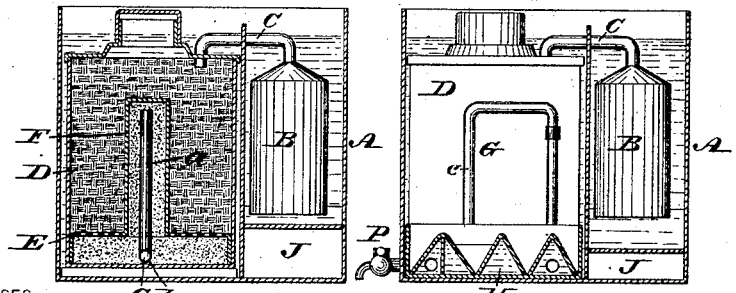
WITNESSES:
Th. Rolle.
W. F. Kircher
INVENTOR:
Emil Noppel.
BY John A. Wiederscheim
ATTORNEY.

UNITED STATES PATENT OFFICE.

EMIL NOPPEL, OF PHILADELPHIA, PENNSYLVANIA.

FILTER.

SPECIFICATION forming part of Letters Patent No. 328,333, dated October 13, 1885.

Application filed June 11, 1885. Serial No. 168,312. (No model.)

*To all whom it may concern:*

Be it known that I, EMIL NOPPEL, a subject of the Emperor of Germany, having resided one year last past in the United States, and made oath of intention to become a citizen thereof, a resident of the city and county of Philadelphia, State of Pennsylvania, have invented a new and useful Improvement in Water Filters and Coolers, which improvement is fully set forth in the following specification and accompanying drawings, in which—

Figure 1 represents a top or plan view of a filter embodying my invention. Fig. 2 represents a vertical section in line $x\,x$, Fig. 1. Fig. 3 represents a vertical section in line $y\,y$, Fig. 1. Fig. 4 represents a vertical section in line $z\,z$, Fig. 1. Fig. 5 represents a vertical section in line $z'\,z'$, Fig. 1.

Similar letters of reference indicate corresponding parts in the several figures.

My invention consists of certain improvements in filters, as will be hereinafter fully set forth.

Referring to the drawings, A represents a receiving-chamber for water or other fluid to be filtered, and having within it a filter, B, which has its inlet at bottom and outlet at top by means of a pipe, C, which leads into a filter, D, located at the side of said chamber A.

In the filter D is a perforated diaphragm, E, which is located near the bottom thereof, and has filtering material above and below the same. Rising from said diaphragm is a tube, F, which is open at bottom and has a closed top and sides, and into the same projects the vertical limb $a$ of a bent pipe, G, the horizontal limb $b$ whereof passes through the bottom of the filter D, below the diaphragm E, and said pipe is continued outside of the filter in inverted-U shape, as at $c$, the termination whereof opens into a cooler, H, on which is placed a suitable quantity of ice for cooling purposes, said cooler being constructed of corrugated plates of metal, &c., forming channels which communicate alternately at opposite ends, so that the water traverses the length of each channel, and is thus subjected to a long cooling-surface.

Below the floors of the chamber A and filter D is a space, J, for the discharge of drip and sediment therein, a common outlet or nozzle, K, being provided for the same, and the floor of the chamber A is inclined, and has at its lower end a valve, so that the water and sediment in said chamber may be readily discharged thereat.

The inlet or supply pipe L of the chamber A is provided with a cock, M, to the plug or stem of which is connected a float, N, whereby the supply of water in said chamber may be automatically regulated.

It will be seen that when water flows into the chamber A it rises in the filter B and thence enters the filter D, and descends therein below the diaphragm E, and so reaches the tube F in a filtered condition. The filtered water now enters the top of the pipe G, and, flowing through the same, reaches the cooler H, whence it is discharged at the outlet or faucet P, it being noticed that only filtered water can escape from the tube F through the pipe G, the water being primarily filtered in its passage through the filter B, and finally filtered by means of the filter D, the filtering material being accessible for removal, replenishing, &c.

As the fluid is subjected to several filtering actions in the filter B, the filter D both above and below the diaphragm E, and in the well or tube F, it is evident that said action is effective.

Having thus described my invention, what I claim as new, and desire to secure by Letters Patent, is—

1. The filter D, having a perforated diaphragm, E, and the tube F, in combination with the pipe G, having vertical part $a$, opening into said tube at the upper part thereof and above the diaphragm E, horizontal part $b$, below said diaphragm E, and bent part $c$, and a cooler, substantially as and for the purpose set forth.

2. A combined filter and cooler, consisting of a double-chambered vessel, one of the said chambers having an inclined floor and an automatic inlet-valve operated by a float, a filter open at the bottom and connected at the top by a pipe to a second filter located in the second chamber, the said second filter having a perforated diaphragm and a tube closed at top rising therefrom, an outlet-pipe having an opening in said tube above the diaphragm, and a cooler, said parts being arranged and combined substantially as described.

EMIL NOPPEL.

Witnesses:
JOHN A. WIEDERSHEIM,
A. P. GRANT.